UNITED STATES PATENT OFFICE.

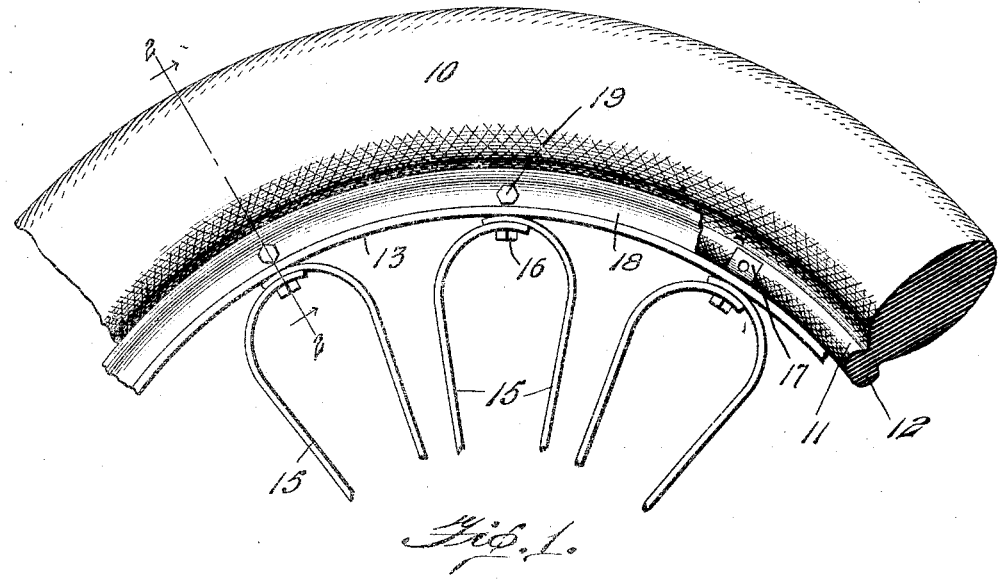
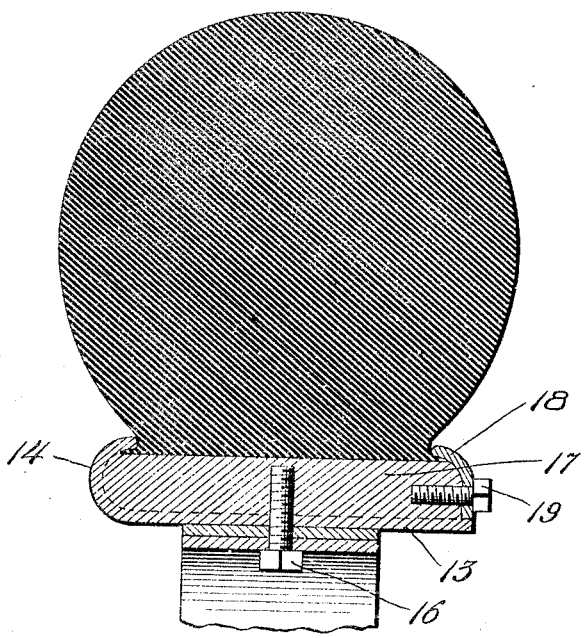

AUGUSTA V. MITCHELL, OF WASHINGTON, DISTRICT OF COLUMBIA.

WHEEL AND TIRE.

1,097,660.  Specification of Letters Patent.  Patented May 26, 1914.

Application filed April 28, 1913. Serial No. 764,142.

*To all whom it may concern:*

Be it known that I, AUGUSTA V. MITCHELL, a citizen of the United States of America, and resident of Washington, in the District of Columbia, have invented certain new and useful Improvements in Wheels and Tires, of which the following is a specification.

This invention relates to vehicle wheels and more particularly to that class of wheels known as "spring wheels."

The objects of the invention are to provide an improved means for attaching the spokes to the rim, and also for attaching the tire to the rim, the construction being simple and very effective.

The novel features of the invention will be apparent from the following description, taken in connection with the accompanying drawings, in which:

Figure 1 is a side elevation of a portion of a wheel embodying my improvements; and Fig. 2 is a transverse section on an enlarged scale on the line 2—2, Fig. 1.

Referring to the drawings, 10 indicates the tire preferably made of resilient material such as rubber and having on its interior the beads 11 and 12 by means of which the tire is secured to the rim. The rim 13 is formed with an outwardly extending flange 14 preferably curved to fit the bead 12, as shown in Fig. 2. Spring spokes 15 of any suitable construction connect the rim 13 with the hub of the wheel and are secured to the rim by means of bolts 16. Adjacent the outer ends of the spokes 15 the rim has attached thereto, in any preferred manner, the transversely extending members 17 which receive the bolts 16 and thus provide the requisite thickness of material to firmly hold the bolts.

The tire 10 is provided with suitable recesses adapted to receive the transverse members 17, which thereby prevent the tire from creeping on the rim. In order to secure the tire against lateral displacement a removable flange 18 is provided on the opposite side of the rim from the flange 14, this flange fitting the bead 11 of the tire and being secured in position by suitable bolts 19 which have threaded engagement with the members 17.

When it is desired to remove the tire it is only necessary to take out the bolts 19, remove the flange 18, and then slip the tire laterally off the rim. It is also possible to disconnect any of the spokes from the rim by taking out the bolt 16, this arrangement permitting a broken spoke to be replaced without disturbing the other parts of the wheel.

While I have illustrated what I now consider the preferred form of my invention, it is to be understood the details of construction may be varied within the scope of the claim, and therefore I do not wish to be limited to the exact details shown and described.

What I claim is:

In a vehicle wheel, the combination of a rim having an outwardly extending flange, transversely extending members secured on the outer face of the rim, a tire on said rim provided with recesses for said members, a removable flange opposed to said first mentioned flange and adapted to coöperate therewith to secure the tire against lateral displacement, resilient spokes adapted to connect the rim with the hub and having their outer ends arranged adjacent said members, bolts engaging said members and securing said spokes to the rim, and other bolts engaging said members and securing said second mentioned flange in position.

In testimony whereof I affix my signature in presence of two witnesses.

AUGUSTA V. MITCHELL.

Witnesses:
JOHN M. COIT,
ARTHUR L. BRYANT.

Copies of this patent may be obtained for five cents each, by addressing the "Commissioner of Patents, Washington, D. C."